Patented Feb. 20, 1934

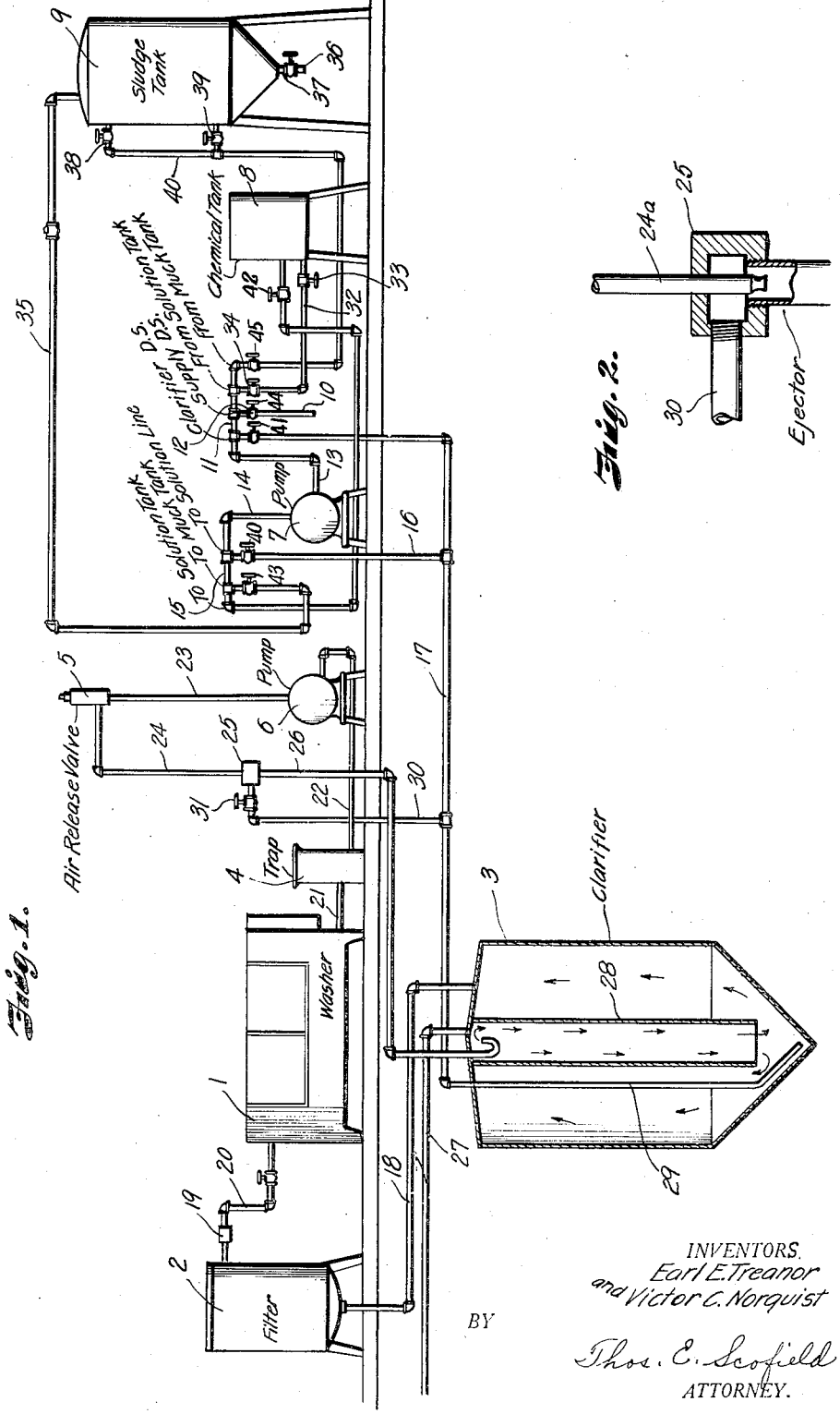

1,947,873

UNITED STATES PATENT OFFICE

1,947,873

CLARIFYING SYSTEM FOR DRY CLEANING SOLVENTS

Victor C. Norquist and Earl E. Treanor, Kansas City, Mo., assignors to Butler Manufacturing Company, Kansas City, Mo., a corporation of Missouri Application June 20, 1930. Serial No. 462,632

2 Claims. (Cl. 210—44)

This invention relates to improvements in systems for purifying dry cleaning solvents and refers more particularly to a system in which dry cleaning solvents are subjected to chemical reaction and subsequent filtration to purify the solvent used in washing fabrics.

The novelty of the invention lies primarily in the design of the clarifying apparatus and the provision made in the piping to permit a prolonged time period during which the solvent is exposed to contacting by the purifying chemical.

Further improvements in the system will be brought out in the subsequent description.

Fig. 1 is a diagrammatic view showing the piping arrangement and details of the apparatus.

Fig. 2 is an enlarged detail of the injector mechanism, at which point in the system the chemical is combined with the solvent.

Referring to the drawing; at 1 is shown a washer, 2 is a filter, 3 designates a clarifier, 4 is a trap, 5 an air release valve, 6 and 7 are pumps, 8 is a chemical tank, and 9 a sludge tank.

The system is cyclic in operation, that is, the solvent is used in the washer and, after use, is discharged through the purifying equipment including the clarifier and filter, and returned to the washer for re-use.

The details of the operation are substantially as follows:

Solvent is charged to the system from any suitable source, through a supply line 10, which connects into a header 11. This supply line is controlled by a valve 12. The header 11 is connected to a suction line 13 of the pump 7 which discharges the solvent through the line 14 and header into the clarifying tank through the line 16 and 17. The solvent fills the clarifying tank and passes out through the line 18, through the filter 2 and is discharged therefrom through a sight glass 19 and line 20 into the washer 1.

After the solvent has been used for cleaning purposes in the washer, it is drawn off therefrom through the pipe 21, thence through the filter 4 and pipe 22 which is connected to the suction side of the pump 6. After passing through this pump, it is discharged through a line 23 and through the air release valve 5, into the pipe 24. This latter pipe terminates in an ejector nozzle 24A, shown in Fig. 2. Surrounding the ejector is a casing 25. The nozzle end of the ejector fits into the pipe 26 communicating with the clarifying tank 3. This pipe 26 may terminate in a straight downwardly directed pipe or be curved upwardly as shown in the drawing in order to facilitate the separation of any air contained in the solvent which is discharged from the top of the clarifier through the vent line 27.

The clarifier 3 is a cone bottom tank having a central tube 28, into which the pipe 26 discharges the solvent mixed with the purifying material. In the bottom of the clarifier is contained the purifying material which may consist of acids, alkalies, alcohols, water or sodium chloride, or mixtures thereof, such materials being used to flocculate and separate the greases from the cleaning solvent. The tube 28 extends to the top of the clarifier and there is connected into the top of this tube only the delivery line 26 and the vent line 27.

The tube 28 extends substantially to the bottom of the clarifying tank, its lower extremity being below the level of the purifying materials contained in the clarifier. Extending also into the lower portion of the conical bottom is a line 29 by means of which the purifying material is drawn by suction into the ejector shown in Fig. 2, through the pipe 29 and connecting pipe 30 which terminates in the ejector casing 25, adjacent the ejector nozzle. Interposed in the line 30 is a valve 31. The type of ejector shown is simply a conventional form and it is understood that any suitable type of design may be used which will create the desired suction which will lift the treating material from the bottom of the clarifier and combine it with the solvent passing through the nozzle 24A.

This design of clarifier tank and the method of drawing up the treating material to be combined with the solvent so that there is a considerable contacting time and turbulent mixture of the purifying material and solvent prior to its discharge into the clarifying tank, affords a considerably better contact between the purifying materials and the solvent, and therefore, improved refining of the solvent.

When the mixture is discharged into the top of the tube 28 through the line 26, any air or gas is vented through the line 27 and the mixture proceeds downwardly through the tube 28, where it is discharged into the body of treating material. After percolating through the treating material in its flow upward through the clarifying tank, it is drawn off through the line 18 and returned to the filter where any foreign materials mechanically held in suspension are removed. The chemical treating material is supplied to the system from a tank 8, through the drawoff line 32 controlled by valve 33. This drawoff line is connected into the header 11 which, in turn, has communication with the suction 13 of the pump 7.

A valve 34 in the header provides further control for the withdrawal of chemical from the tank. From the pump 7 the chemical withdrawn from the tank 8 may be discharged through the pipe 14, thence through the line 16 and 17 into the bottom of the clarifier tank. In a like manner, by controlling the valves in the header 11, the sludge accumulating in the bottom of the clarifier may be picked up, using the line 29 as a suction pipe and discharging by means of the pump 7 through the header 15 and line 35 to the sludge tank 9. After settling in the sludge tank, the bottom can be drawn off through the pipe 36, controlled by valve 37, and the solvent separated by settling, drawn off from either of the pipes 38 or 39 which terminate in the pipe 40. The pipe 40, in turn, is connected to the header 11 so that this solvent settled from the sludge may be returned to the system through the discharge pipe 14, pipe 16 and line 17.

Opposite the valves which are found in the headers 11 and 15 is designated the purpose for which the valves serve as a control. The piping, including the valves and pumps, are so arranged that a very flexible system is provided and the fluids may be directed in any desired course.

In operation, pump 7 pumps chemical from tank 8 past valve 33 which is open, through line 32, valve 34, line 13, pump 7, through valve 40, into line 16 and into line 17, it being understood that valves 42, 45, 44, 41 and 43 are closed, and valves 33, 34 and 40 are open. The path of the chemical splits and part of it goes to the bottom of the clarifier through line 29, and part of it passes through line 30 through valve 31 into the ejector device 25. Inasmuch as pump 6 is pumping solvent from trap 4 through line 24, into the ejector the ejector action will admix sodium hydroxide from line 30 and the mixture will pass through line 26 to the clarifier where it is discharged into the center portion 28. When it is desired to clean out the clarifier, valve 41 is opened, valves 44, 45, 42, 33, 34 and 40 are closed, while valve 43 is opened. Pump 7 then takes suction through line 17, through valve 41, into manifold 11, line 13, and discharges through line 14, manifold 15, valve 43 and line 35 to the sludge tank 9.

When it is desired to add clear solvent to chemical tank 8, valves 43, 40, 41 and 45 are closed, and valves 42 and 44 are opened. Pump 7 then takes suction through line 10, through valve 44, through manifold 11 into line 13, through line 14, into manifold 15, through valve 42, and into chemical tank 8, it being understood, of course, that valves 33 and 34 are closed. After the clean solvent is mixed with the chemical in chemical tank 8 activated carbon is added to the mixture. It is believed that the operation will be clear from the foregoing description.

While a single tank 3 is shown as the clarifying stage, the system may include a series of tanks or containers similar to a clarifier. Where a plurality of clarifiers are used in the system the solvent will pass successively from one tank to the following tank and discharge from the final clarifier back to the filter through a line such as that shown and designated by the numeral 18 in the drawing. Such an arrangement, wherein a plurality of clarifying tanks are used, contemplates that an injector would be interposed between each of the tanks so that the time period of contract between the solvent and the treating chemical would be prolonged. In a system using a plurality of tanks, the chemical would be withdrawn from one tank and introduced to the injector just prior to its introduction to the same tank. The necessity of having a plurality of tanks may be occasioned also by the use of different kinds of chemicals for treating in the same system, as, for instance alkalies, acids, alcohols, and water.

We claim as our invention:

1. A process for purifying contaminated dry cleaning solvents comprising the steps of withdrawing a contaminated solvent from a washing zone, contacting the solvent so withdrawn with an amount of a chemical in a mixing zone to form a mixture, simultaneously introducing another amount of the same chemical into a clarifying zone, and passing the mixture of the chemical and the contaminated solvent through the chemical in the clarifying zone.

2. A dry cleaning apparatus including in combination a washer, a clarifier, a chemical tank, a line for passing solvent from the washer to the clarifier, means for passing chemical from the chemical tank to the clarifier and a means for withdrawing chemical from said last named means and introducing it into the line from the washer to the clarifier.

VICTOR C. NORQUIST.
EARL E. TREANOR.